No. 737,357. PATENTED AUG. 25, 1903.
H. CRUMP & L. METZ.
HOSE COUPLING.
APPLICATION FILED APR. 14, 1903.
NO MODEL.
*Fig. 1*
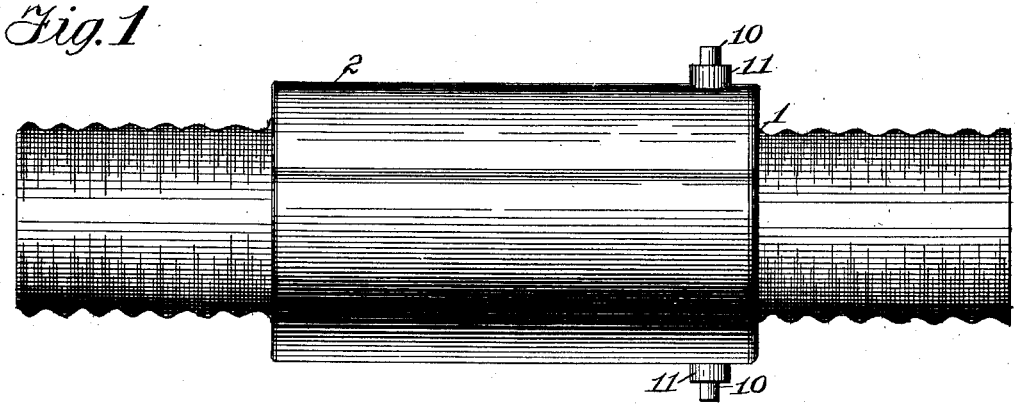
*Fig. 2*
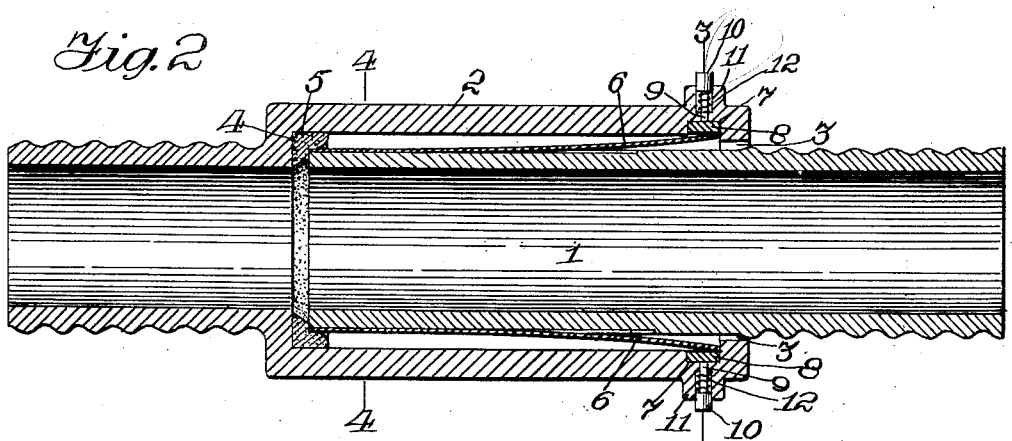
*Fig. 3* *Fig. 4*
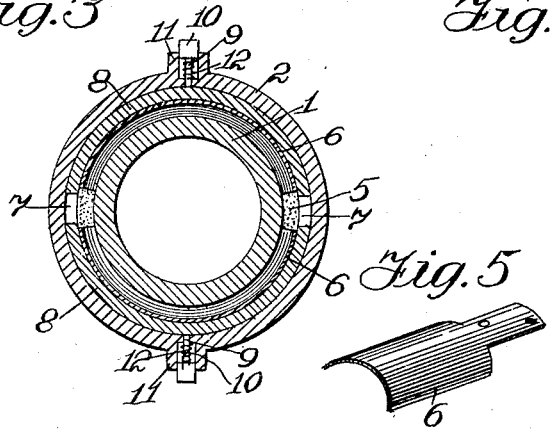
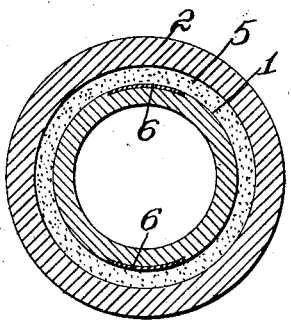
*Fig. 5*
Witnesses:
Geo B Rowley
E. E. Potter
Inventors:
Harry Crump
Leon Metz
By N. C. Everitt Co.
Attorneys.

No. 737,357. Patented August 25, 1903.

UNITED STATES PATENT OFFICE.

HARRY CRUMP AND LEON METZ, OF FRANK, PENNSYLVANIA.

HOSE-COUPLING.

SPECIFICATION forming part of Letters Patent No. 737,357, dated August 25, 1903.

Application filed April 14, 1903. Serial No. 152,498. (No model.)

*To all whom it may concern:*

Be it known that we, HARRY CRUMP and LEON METZ, citizens of the United States of America, residing at Frank P. O., in the county of Allegheny and State of Pennsylvania, have invented certain new and useful Improvements in Hose-Couplers, of which the following is a specification, reference being had therein to the accompanying drawings.

This invention relates to certain new and useful improvements in hose-couplers, and more particularly to that class of couplers which are adapted to be connected without the use of threads or nuts.

The object of this invention is to provide a hose-coupler which may be connected by simply forcing the two parts together, the locking of which automatically takes place thereby, and while a perfect and secure joint is thus made to provide a coupler in which the parts may be quickly and easily disconnected.

With the above and other objects in view the invention consists in the novel construction, combination, and arrangement of parts to be hereinafter more fully described, and specifically pointed out in the claims.

In describing the invention in detail reference is had to the accompanying drawings, forming a part of this specification, and wherein like numerals of reference indicate like parts throughout the several views, in which—

Figure 1 is an outside elevation of our improved coupler in its connected position. Fig. 2 is a longitudinal section of the same. Fig. 3 is a cross-sectional view taken on line 3 3 of Fig. 2. Fig. 4 is a cross-section taken on line 4 4 of Fig. 2. Fig. 5 is a detail perspective view of one of the locking members.

In carrying out this invention we provide the male portion 1 and the female portion 2, each of which is provided on its outer end with suitable projections, to which the hose is adapted to be connected. The female member 2 is of slightly-greater diameter than the male member and at the outer end is provided with the annular ledge 3, the aperture through which is of slightly-greater diameter than the outside diameter of the male member 1. The member 2 has provided at its inner or bottom end a ledge 4, against which rests the flexible washer 5, which may be formed of felt, rubber, or other suitable material and held thereagainst by any suitable means. The male member 1 has secured to its outer side a plurality of spring locking members 6, which may be secured thereto by rivets or by any other suitable means. As shown in the drawings, we have employed two of these members, and at their end by which they are attached to the member 1 they are of less width than at their outer locking portion. The member 1 is suitably countersunk to receive the end of these locking members, which secures them to said member 1, and the said members are formed on a slight curve, whereby their locking or engaging ends will spring behind the annular ledge 3 when the two members are connected. The member 2 has provided just rear of the annular ledge 3 the countersunk opening 7, in which the segmental disengaging members 8 8 are adapted to rest, the said members being provided intermediate of their length with a pin 9, which passes through the outer wall of the member 2, said pin carrying on its outer end the button 10, which projects slightly above the boss 11, which is formed on the member 2, a spring 12 normally holding these members 8 within the recess; but when the buttons 10 are forced within boss 11, thereby compressing spring 12, the members 8 will be forced out of the recess, thereby engaging locking member 6 and causing the same to be compressed toward an axial center, whereby they may be moved through the opening provided in the annular groove 3, thus permitting the male member to be withdrawn from the female member 2. The bottom end of this male member 1, when in its connected position, is forced against the flexible washer 5, thereby securing a water-tight joint within said coupling.

It will be noted that a substantially smooth passage is afforded for the water in passing through this coupling.

It will be further noted that various changes may be made in the details of construction without departing from the general spirit of our invention.

Having fully described our invention, what we claim as new, and desire to secure by Letters Patent, is—

1. In a hose-coupling the combination of the male member carrying spring locking members of a female member provided with a flange on said spring locking members being adapted to engage the inner surface of said flange, said female member being provided with segmental plates adapted to engage and compress said spring locking member whereby the same may be designated from the rear inner edge of said flange, and a ledge formed on the bottom of said female member adapted to seat a washer, said washer being engaged by the inner edge of said male member, substantially as described.

2. In a hose-coupler the combination with the male member, a plurality of locking members carried thereby, a female member, an annular ledge formed on the outer end of said female member, said locking member being adapted to engage behind said ledge, a plurality of segmental plates carried by said female member, said plates being normally held in outward position by means of a spring, said plates being adapted to compress said locking members to permit of the withdrawal of the male member, and a flexible washer interposed between the end of the male member and the female member to provide a water-tight joint, substantially as described.

In testimony whereof we affix our signatures in the presence of two witnesses.

HARRY CRUMP.
LEON METZ.

Witnesses:
CHAS. METZ,
H. B. MOORE.